Patented Nov. 19, 1946

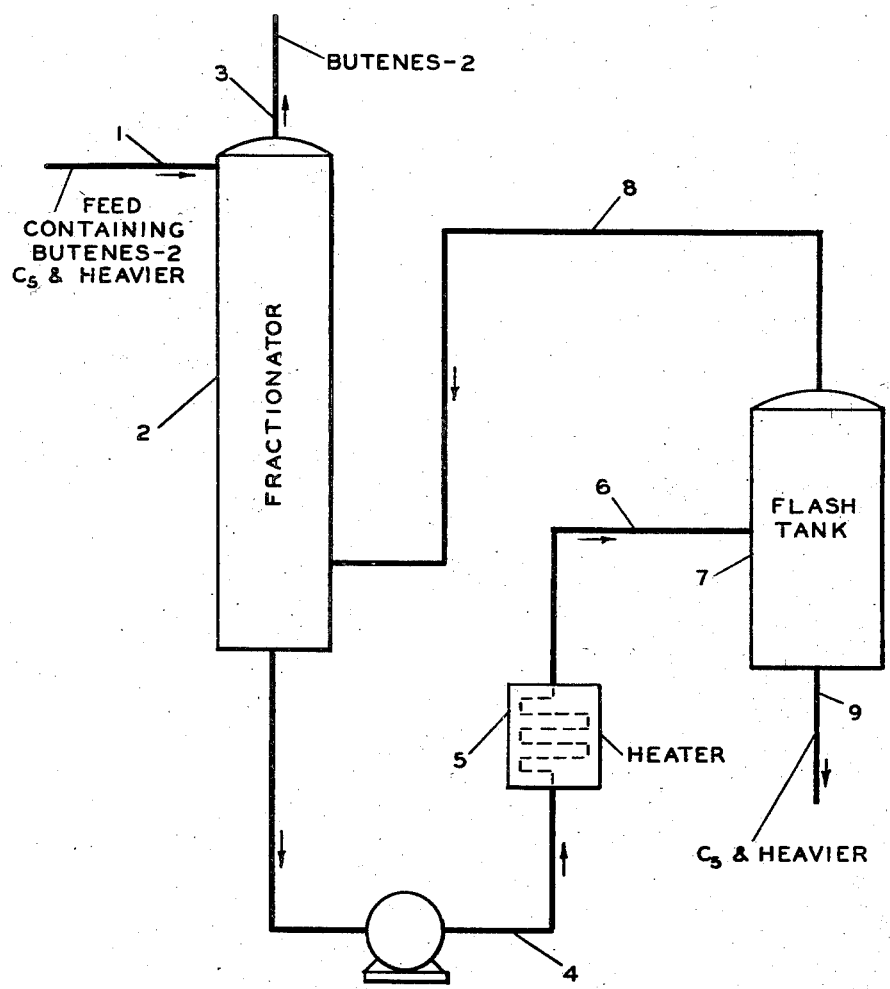

2,411,264

UNITED STATES PATENT OFFICE 2,411,264

SEPARATION OF HYDROCARBONS

Karl H. Hachmuth, Bartlesville, Okla., assignor to Phillips Petroleum Company, a corporation of Delaware Application May 8, 1944, Serial No. 534,599

6 Claims. (Cl. 202—40)

This invention relates to a means for separating a light hydrocarbon from heavier hydrocarbons. More specifically, this invention relates to the recovery of butenes-2 or other light olefinic hydrocarbons from admixture with a $C_5$ and heavier hydrocarbon stream such as that produced as effluent in the dehydrogenation of normal butenes to butadiene by a fractionation step wherein the desired hydrocarbon is purposely incompletely recovered from the kettle product in order to permit fractionation at low reboiler temperatures. Recovery of the desired hydrocarbon, butenes-2, from the kettle product is effected by rapid heating and flashing in external equipment and return of the vapor products to the fractionator. This eliminates the necessity of maintaining the reboiler section of the fractionator at temperatures which promote thermal polymerization of the heavy hydrocarbons and consequent fouling of the reboiler. By this arrangement, temperatures at which polymerization and consequent fouling of heating elements occurs may be localized in relatively small external equipment designed to permit rapid and easy cleaning. In addition to preventing polymerization of the $C_5$ and heavier hydrocarbons in the fractionator, this arrangement prevents polymerization of the desired light hydrocarbon butenes-2 in the fractionator and decreases polymerization of said butenes-2 in the external equipment because of the decreased time of exposure of the butenes-2 to high reboiler temperatures.

One object of this invention is to provide a means for recovery of butenes-2 or other light hydrocarbons from heavier hydrocarbons by fractionation in conjunction with a flash operation on the reboiler product. Another object is to provide an improved method of de-oiling butenes especially butenes-2 contained in the effluent from dehydrogenation of butenes to butadiene. Another object of this invention is to prevent fouling of the fractionator reboiler. Numerous other objects will hereinafter appear.

The accompanying drawing portrays diagrammatically one arrangement of equipment suitable for carrying out the present invention.

To obtain substantially complete recovery of light olefinic hydrocarbons from heavier hydrocarbons frequently offers considerable difficulty. This is true primarily because in the process of fractionation the concentration of lighter materials decreases progressively from the top to the bottom of the fractionator. As the concentration of the heavier material increases, the boiling point of the mixtures increases. Consequently, the temperature required in the reboiler section of the fractionator to supply the vapors necessary for "stripping out" the final traces of the desired light olefinic hydrocarbons is directly related to the average molecular weight of the heavier hydrocarbons present. In instances where the heavier hydrocarbons have a high molecular weight or the fractionation is being carried out under relatively high pressure, the temperature required in the reboiler section may be high enough to cause polymerization of the $C_5$ and heavier hydrocarbons, and consequent fouling of the reboiler in addition to loss of the desired light hydrocarbons by polymerization. These difficulties can be overcome by operating at subatmospheric pressures or by steam distillation. However, operating at subatmospheric pressure is undesirable from the standpoint of the possibility of air leaks into the equipment which would tend to promote the polymerization of olefinic materials. Steam distillation is undesirable from the standpoint that the resultant product will be contaminated with water. Removal of this water would necessitate dehydrating equipment.

My invention offers a means for overcoming these difficulties without resorting to vacuum or steam distillation. The advantage of this invention lies in the method of supplying the quantity of heat required to recover the desired light hydrocarbons from the $C_5$ and heavier hydrocarbons. In conventional fractionators all of the required heat is supplied by the usual reboiler. This arrangement results in reboiler temperatures which may be sufficiently high to cause polymerization of the heavier hydrocarbons and fouling of the reboiler, as well as loss of desired light hydrocarbons through polymerization. Use of reboilers with larger surfaces than usual may result in less fouling since the required quantity of heat can be supplied at a lower tube surface temperature, thereby reducing the rate of polymerization at the tube surface. However, a mere increase of reboiler surface will not accomplish sufficient improvement of the process. This is true since there is a limit to both the increase of reboiler surface and the resultant decrease in the temperature differential between the inner and outer reboiler tube surfaces. As the temperatures of these tube surfaces approach the same value, the surface area of the reboiler upon which polymerization and fouling can occur has increased to such an extent that any advantage gained by lowering the tube surface temperatures is cancelled. My invention is advantageous in that it permits operating between these limits and at the same time the fractionator reboiler temperatures may be maintained sufficiently low to prevent fouling.

In the practice of this invention, most of the heating surface is located in the reboiler of the fractionator, which operates at a moderate temperature and supplies the heat required to remove most of the light hydrocarbons, while a small external heater which operates at a high temperature serves to add the additional heat necessary to strip out the remaining light hydrocarbons from the heavier hydrocarbons. The advantage lies in the fact that by removing light hydrocarbons in the fractionator while maintaining the reboiler at a moderate temperature little or no fouling of the reboiler occurs. Some fouling will occur in the small external heater; however, by decreasing the time of exposure of said hydrocarbons to polymerization temperatures in accordance with the present invention, much less fouling will occur than in a conventional fractionator wherein the total heat requirement is supplied by the usual reboiler.

The method of this invention is advantageous for the recovery of butenes-2 from a $C_5$ and heavier hydrocarbon stream such as that produced during the manufacture of butadiene. For example, in my copending patent applications, Serial No. 454,312, filed August 10, 1942, and Serial No. 481,305, filed March 31, 1943, concerning butadiene recovery, a butadiene-rich $C_4$ concentrate is prepared by fractional distillation. This concentrate constitutes the feed to a subsequent extractive distillation step. In preparing this concentrate approximately one-half of the butenes-2 in the feed to the fractionator is retained in the kettle product with the $C_5$ and heavier hydrocarbons. Also in the final fractionation step, described in the above mentioned applications, for the recovery of essentially pure butadiene as the overhead product, butenes-2 are retained in the kettle product with small percentages of heavier hydrocarbons, such as, butadiene dimer, small amounts of extractive distillation solvent carried over by entrainment, etc., and vinyacetylene, etc.

Recovery of the butenes-2 from these kettle products for recycling to a dehydrogenation step for conversion to butadiene or for other uses, offers the difficulties previously described when conventional distillation equipment is employed. My invention overcomes these difficulties. By referring to the drawing, the following discussion of my invention may be more readily understood.

A feed stream consisting of butenes-2 plus $C_5$ and heavier hydrocarbons is introduced at the top tray of fractionator 2 through line 1. In fractionator 2, most of the butenes-2 are withdrawn as the overhead product through line 3.

Since the temperature of the reboiler section of the fractionator 2 necessary to supply the vapors to completely strip out the butenes-2 is sufficiently high to promote polymerization and fouling of the reboiler, the reboiler is maintained at a lower temperature and part of the butenes-2 are withdrawn with the $C_5$ and heavier hydrocarbons in the reboiler product. However, it is desirable to recover these butenes-2 from the heavier hydrocarbons. Using the method of my invention the $C_5$ and heavier hydrocarbons together with some butenes-2 are withdrawn from the reboiler section of fractionator 2 through line 4, this kettle product is then passed into external heater 5. The stream is rapidly heated in external heater 5 and passed into flash tank 7 through line 6. In flash tank 7 the remaining butenes-2 are separated from the $C_5$ and heavier hydrocarbons. The butenes-2 vapors are withdrawn from the top of flash tank 7 through line 8 and are introduced into fractionator 2 at some point at or above the reboiler section. Introduction of the butenes-2 vapors at this point helps to maintain moderate reboiler temperatures in fractionator 2. The $C_5$ and heavier hydrocarbons are withdrawn from the bottom of flash tank 7 through line 9 for disposal (means not shown).

The proportion of the butenes-2 contained in the original feed which is left in the bottoms should be such that the temperature in the reboiler does not exceed 200° F. Ordinarily this will represent from about 20 to about 25 mol per cent of the fractionator reboiler effluent.

*Example*

In a butadiene recovery step of the type previously mentioned, the kettle products from the fractionator wherein a butadiene rich $C_4$ concentrate was prepared (not shown) and from the fractionator wherein essentially pure butadiene was recovered (not shown) were combined to form the feed to fractionator 2. This feed was introduced onto the top tray of fractionator 2 through line 1. The composition of the feed was as follows:

| Components | Stream 1, mol per cent |
|---|---|
| Butadiene | 0.88 |
| Isobutylene | 0.02 |
| Butene-1 | 0.17 |
| Butene-2 (low boiling) | 39.50 |
| Butene-2 (high boiling) | 53.52 |
| n-Butane | 1.65 |
| $C_5$ and heavier | 4.26 |
| | 100.00 |

Fractionator 2, a 15 tray bubble plate tower, was operated at a pressure of about 60 pounds per square inch absolute. The temperature of the head of the tower was 120° F., the temperature of the reboiler section was 183° F.

The overhead stream 3 from the fractionator 2 (wherein most of the butenes-2 were removed) had the following composition:

| Components | Stream 3, mol per cent |
|---|---|
| Butadiene | 0.91 |
| Isobutylene | 0.02 |
| Butene-1 | 0.18 |
| Butene-2 (low boiling) | 40.87 |
| Butene-2 (high boiling) | 55.42 |
| n-Butane | 1.71 |
| $C_5$ and heavier | 0.89 |
| | 100.00 |

Said butenes-2 rich overhead stream 3 after proper cooling (means not shown) was then recycled as part of the feed stock for second stage dehydrogenation (also not shown).

The kettle product withdrawn from the reboiler section of fractionator 2 through line 4 had the following composition:

| Components | Stream 4, mol per cent |
| --- | --- |
| Butene-2 (low boiling) | 13.00 |
| Butene-2 (high boiling) | 13.00 |
| $C_5$ and heavier | 74.00 |
|  | 100.00 |

The kettle product was passed through line 4 to heater 5 where said kettle product was rapidly heated before being charged into flash tank 7. Flash tank 7 was operated at a pressure of approximately 65 pounds per square inch absolute and at a temperature of 334° F. Under such conditions the butenes-2 were separated from the $C_5$ and heavier hydrocarbons. The butenes-2, thus separated, were withdrawn from the top of flash tank 7 and returned to fractionator 2 through line 8. The $C_5$ and heavier hydrocarbons denuded of butenes-2 were withdrawn from flash tank 7 through line 9. The two effluent streams from the flash tank 7 had the following compositions:

| Components | Streams 8 and 9, mol per cent | |
| --- | --- | --- |
| Butene-2 (low boiling) | 15.13 | 2.40 |
| Butene-2 (high boiling) | 15.13 | 2.40 |
| $C_5$ and heavier | 69.74 | 95.20 |
|  | 100.00 | 100.00 |

This method is not limited to butenes-2 but can be applied to the removal of other light olefinic hydrocarbons from heavier hydrocarbons.

I claim:

1. The method of separating butenes-2 from a mixture of said butenes-2, $C_5$ and heavier hydrocarbons produced in the manufacture of butadiene which comprises feeding a hydrocarbon mixture containing said butenes-2 and heavier hydrocarbons to a fractionating column and fractionally distilling same therein, supplying to the bottom of said column heat in amount such that said butenes-2 is incompletely removed from the kettle product and maintaining the reboiler section of the column at such a temperature that polymerization in the fractionating column is prevented, withdrawing an overhead of said butenes-2, withdrawing the kettle product containing said heavier hydrocarbons in admixture with a substantial portion of said butenes-2, heating said withdrawn kettle product in a separate zone to a temperature such that the butenes-2 content thereof will be substantially completely driven off and flashing said butenes-2 therefrom.

2. The method of separating butenes-2 from heavier hydrocarbons which comprises feeding a hydrocarbon mixture produced in the manufacture of butadiene containing said butenes-2 and heavier hydrocarbons to a fractionating column and fractionally distilling same therein, supplying to the bottom of said column heat in amount such that said butenes-2 are incompletely removed from the kettle product and maintaining the reboiler section of the column at such a temperature that polymerization in the fractionating column is prevented, withdrawing an overhead of said butenes-2, withdrawing the kettle product containing said heavier hydrocarbons in admixture with a substantial portion of said butenes-2, heating said withdrawn kettle product in a separate zone to a temperature such that the butenes-2 content thereof will be substantially completely driven off and flashing said butenes-2 therefrom, and introducing the butenes-2 so flashed off into said column.

3. The method of separating butenes from heavier hydrocarbons produced in the manufacture of butadiene which comprises feeding a hydrocarbon mixture containing said butenes and heavier hydrocarbons to a fractionating column and fractionally distilling same therein, supplying to the bottom of said column heat in amount such that said butenes are incompletely removed from the kettle product and maintaining the reboiler section of the column at such a temperature that polymerization in the fractionating column is prevented, withdrawing an overhead of said butenes, withdrawing the kettle product containing said heavier hydrocarbons in admixture with a substantial portion of said butenes, heating said withdrawn kettle product in a separate zone to a temperature such that the butenes content thereof will be substantially completely driven off and flashing said butenes therefrom, and introducing the butenes so flashed off into said column at a point closely adjacent the reboiler section thereof and thereby aiding in maintenance of moderate reboiler temperatures therein.

4. The method of separating butenes from $C_5$ and heavier hydrocarbons produced in the manufacture of butadiene which comprises feeding a hydrocarbon mixture containing said butenes, $C_5$ and heavier hydrocarbons to a fractionating column and fractionally distilling the same therein, supplying to the bottom of said column heat in amount such that the butenes are incompletely removed from the kettle product and maintaining the reboiler section at such temperature that polymerization in the fractionating column is prevented, withdrawing an overhead of said butenes, withdrawing a kettle product containing said heavier hydrocarbons in admixture with a substantial portion of said butenes, in a separate zone and at such speed that polymerization is minimized heating said withdrawn kettle products to a temperature such that the butene content thereof will be almost completely driven off by flashing, confining temperatures causing polymerization to said separate heating zone, flashing said butenes from said heated kettle product and introducing the butenes so flashed off into said fractionating column at a point closely adjacent to the reboiler section thereof.

5. The method of claim 4 wherein the amount of butene left in said kettle product is such that the temperature in the bottom of said column is kept from exceeding 200° F.

6. The method of claim 4 wherein the amount of butene left in said kettle product represents from about 20 to about 25 mol per cent of said kettle product.

KARL H. HACHMUTH.